US009052509B2

(12) United States Patent
Sukekawa

(10) Patent No.: US 9,052,509 B2
(45) Date of Patent: Jun. 9, 2015

(54) MICROSCOPE SYSTEM INCLUDING DETACHABLE STAGE AND DETACHABLE TRANSMITTED ILLUMINATION OPTICAL SYSTEM

(71) Applicant: OLYMPUS CORPORATION, Tokyo (JP)

(72) Inventor: Minoru Sukekawa, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 245 days.

(21) Appl. No.: 13/675,263

(22) Filed: Nov. 13, 2012

(65) Prior Publication Data

US 2013/0120834 A1    May 16, 2013

(30) Foreign Application Priority Data

Nov. 16, 2011   (JP) ................. 2011-250941

(51) Int. Cl.
*G02B 21/08* (2006.01)
*G02B 21/26* (2006.01)

(52) U.S. Cl.
CPC .............. *G02B 21/08* (2013.01); *G02B 21/088* (2013.01); *G02B 21/26* (2013.01)

(58) Field of Classification Search
CPC ........ G02B 21/08; G02B 21/06; G02B 21/241
USPC .......................................... 359/368, 385, 390
See application file for complete search history.

(56) References Cited

U.S. PATENT DOCUMENTS

| 4,148,552 | A |   | 4/1979  | Suzuki et al. |
| 4,210,384 | A |   | 7/1980  | Meyer et al. |
| 5,175,644 | A | * | 12/1992 | Dosaka ................. 359/392 |
| 5,270,855 | A | * | 12/1993 | Hasegawa ............. 359/368 |

(Continued)

FOREIGN PATENT DOCUMENTS

| DE | 87 14 912 U1 | 2/1988 |
| DE | 102 61 663 A1 | 7/2004 |

(Continued)

OTHER PUBLICATIONS

Extended European Search Report and Opinion dated Feb. 18, 2013 (in English), which issued in counterpart European Application No. 12007051.1-1504.

*Primary Examiner* — Frank Font
(74) *Attorney, Agent, or Firm* — Holtz, Holtz, Goodman & Chick PC

(57) ABSTRACT

A microscope system includes a stage on which a specimen is placed; an objective lens configured to condense at least observation light from the specimen on the stage; a transmitted illumination optical system configured to irradiate the specimen with transmitted illumination light ejected from a light source, which is illumination light transmitting the specimen; and a microscope body part including a base unit holding the transmitted illumination optical system, a supporting column standing upright from the base unit, and an incident-light illumination optical system provided on the end of a side different from the base unit side of the supporting column and irradiating the specimen with incident-light illumination light which is illumination light ejected from a light source to be reflected on the specimen, wherein the stage and the transmitted illumination optical system are attachable to/detachable from the microscope body part.

4 Claims, 12 Drawing Sheets

(56) References Cited

U.S. PATENT DOCUMENTS

| | | | | |
|---|---|---|---|---|
| 6,160,662 | A * | 12/2000 | Uchida et al. | 359/390 |
| 6,239,905 | B1 * | 5/2001 | Toyoda et al. | 359/392 |
| 6,304,375 | B1 * | 10/2001 | Furuhashi | 359/385 |
| 6,404,546 | B2 * | 6/2002 | Toyoda et al. | 359/392 |
| 6,693,741 | B1 * | 2/2004 | Sukekawa | 359/368 |
| 6,853,481 | B1 * | 2/2005 | Sukekawa | 359/368 |
| 6,967,773 | B2 * | 11/2005 | Sukekawa | 359/368 |
| 8,711,474 | B2 * | 4/2014 | Griffin et al. | 359/385 |
| 2006/0092503 | A1 * | 5/2006 | Saunders | 359/368 |
| 2006/0139747 | A1 * | 6/2006 | Dietzsch et al. | 359/368 |
| 2008/0123185 | A1 * | 5/2008 | Yoneyama et al. | 359/383 |
| 2008/0291532 | A1 * | 11/2008 | Xu et al. | 359/383 |

FOREIGN PATENT DOCUMENTS

| | | |
|---|---|---|
| GB | 2 084 754 A | 4/1982 |
| JP | 2002-031759 A | 1/2002 |

* cited by examiner

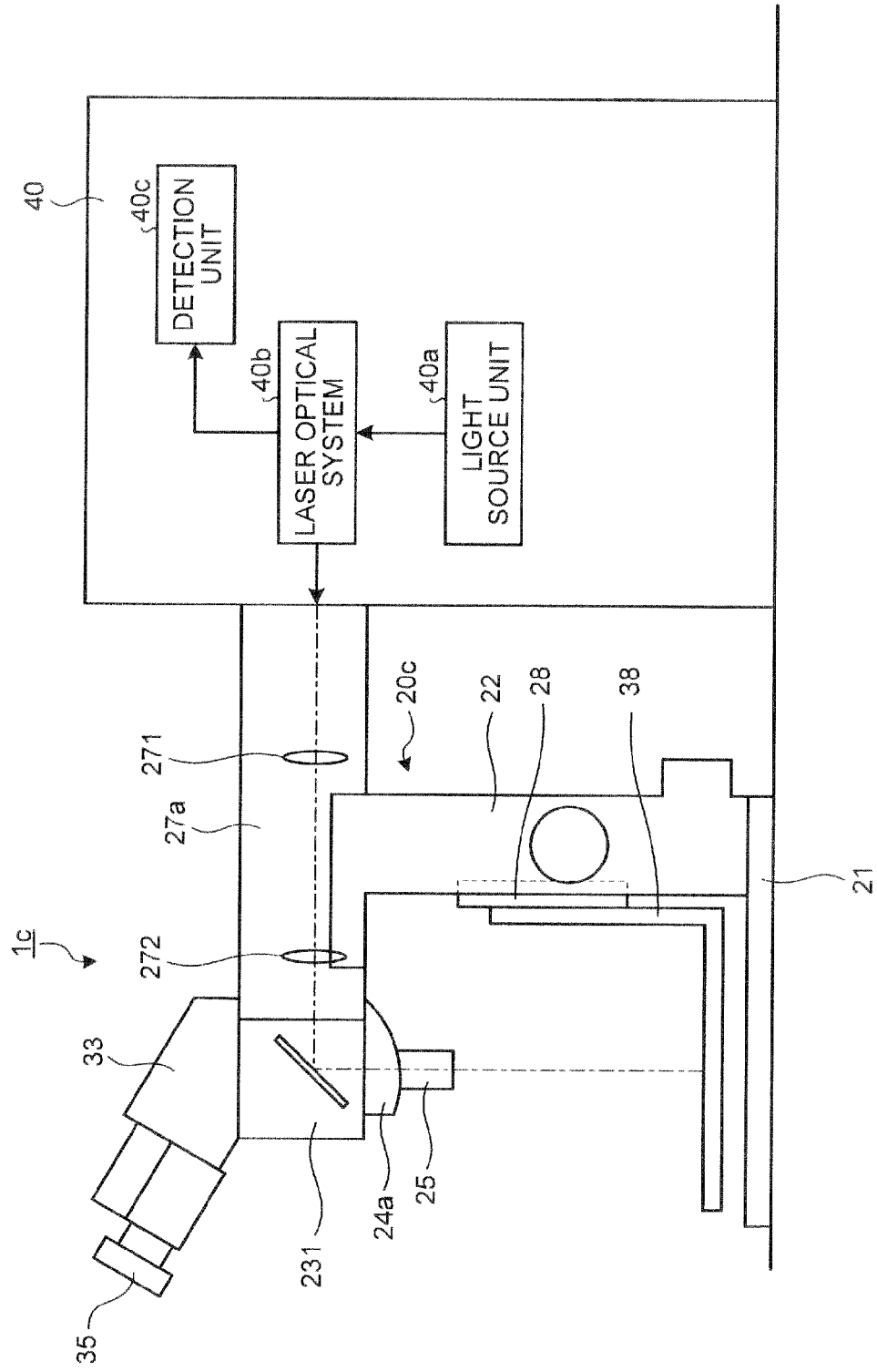

MICROSCOPE SYSTEM INCLUDING DETACHABLE STAGE AND DETACHABLE TRANSMITTED ILLUMINATION OPTICAL SYSTEM

CROSS-REFERENCE TO RELATED APPLICATIONS

This application is based upon and claims the benefit of priority from Japanese Patent Application No. 2011-250941, filed on Nov. 16, 2011, the entire contents of which are incorporated herein by reference.

BACKGROUND OF THE INVENTION

1. Field of the Invention

The present invention relates to, for example, a microscope system that irradiates a specimen with illumination light and acquires a specimen image generated based on light transmitted or reflected by the specimen.

2. Description of the Related Art

Conventionally, a microscope system with a microscope apparatus has been used, which illuminates and observes a specimen to observe cells and the like in a field such as medicine or biology. Further, also in an industrial field, a microscope apparatus has been used for various purposes such as quality management of a metallic structure, and the like, or research and development of new materials, examination of electronic devices or magnetic heads, and the like. As a microscope system that observes a specimen, a microscope system has been known, which has a configuration that captures the specimen image by using an imaging device such as a CCD camera and displays the specimen image on a monitor, in addition to observation with naked eyes.

In recent years, with diversification of types of specimen observed by using the aforementioned microscope system, microscope systems have been required, which can observe objects, from very thin objects like a cell up to thick objects like a small animal. In regard to the requirement, for example, Japanese Laid-open Patent Publication No. 2002-31759 discloses a microscope that includes a base unit configured to hold a stage mounted with a specimen, a frame with a trunk which stands upright to the base unit, an incident-light illumination and imaging tube provided on the top of the trunk and having an incident-light illumination light source, and an objective arm configured to hold an objective lens and movable vertically along the trunk, and can perform observation depending on the thickness of the specimen by changing a distance between the objective lens and the stage by changing an attachment position onto the base unit of the stage or changing the vertical length of the objective arm. The microscope includes a lamp house having a transmitted illumination light source and can perform transmitted-light illumination observation of the specimen.

SUMMARY OF THE INVENTION

A microscope system according to an aspect of the present invention includes: a stage on which a specimen is placed; an objective lens configured to condense at least observation light from the specimen on the stage; a transmitted illumination optical system configured to irradiate the specimen with transmitted illumination light ejected from a light source, which is illumination light transmitting the specimen; and a microscope body part including a base unit holding the transmitted illumination optical system, a supporting column standing upright from the base unit, and an incident-light illumination optical system provided on the end of a side different from the base unit side of the supporting column and irradiating the specimen with incident-light illumination light which is illumination light ejected from a light source to be reflected on the specimen, wherein the stage and the transmitted illumination optical system are attachable to/detachable from the microscope body part.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is a schematic view illustrating the configuration of the microscope system according to Modified Example 2-3 of the second embodiment of the present invention.

DETAILED DESCRIPTION OF THE PREFERRED EMBODIMENTS

Hereinafter, embodiments of the present invention will be described in detail with reference to the accompanying drawings. Incidentally, the present invention is not limited to the embodiments described below. In the following description, each drawing just schematically illustrates a shape, a size, and a positional relationship to understand the present invention and therefore, the present invention is not limited to the shape, the size, and the positional relationship illustrated in each drawing. Furthermore, in each drawing, a part of hatching on a cross section is omitted for clearness of a configuration. Moreover, numerical values described below are just examples suitable for the present invention and therefore, the present invention is not limited to the described numerical values.

First Embodiment

Figure 1:
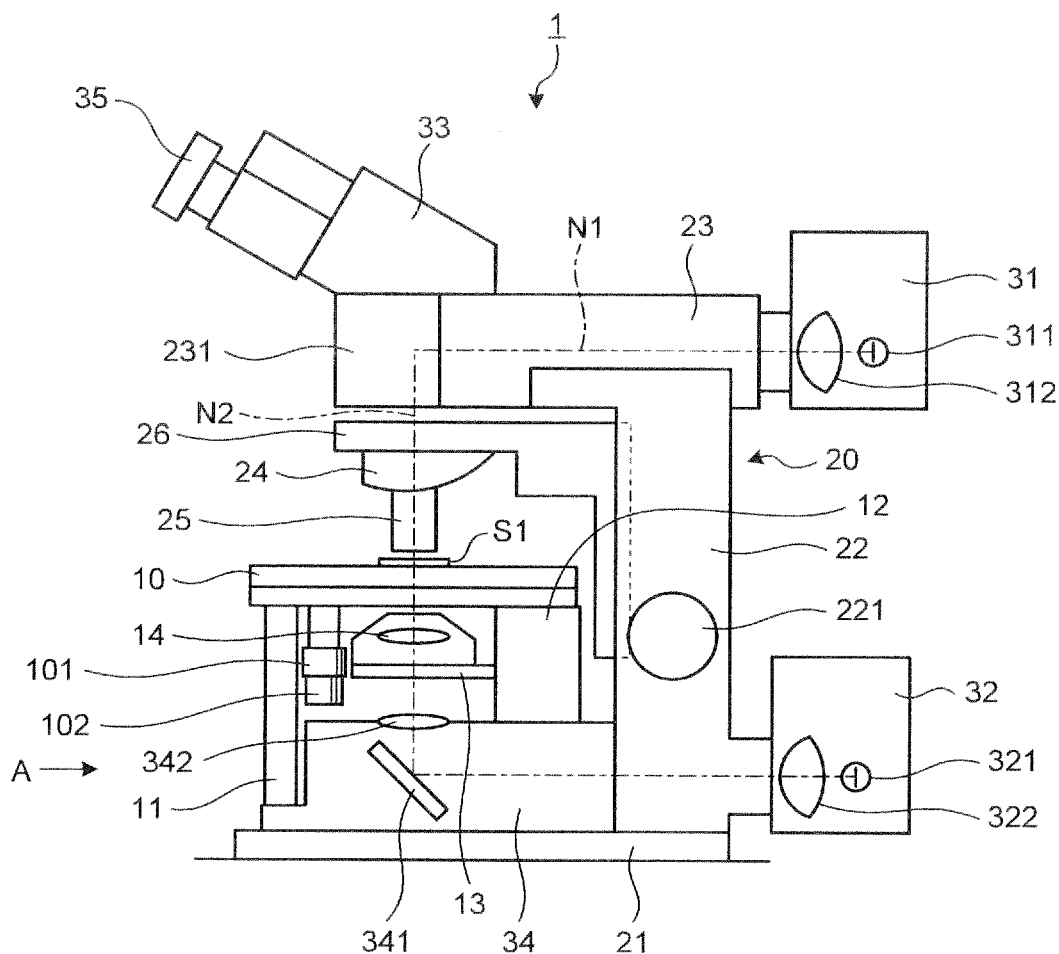
FIG. 1 is a schematic view illustrating a configuration of a microscope system according to a first embodiment of the present invention.
Figure 2:
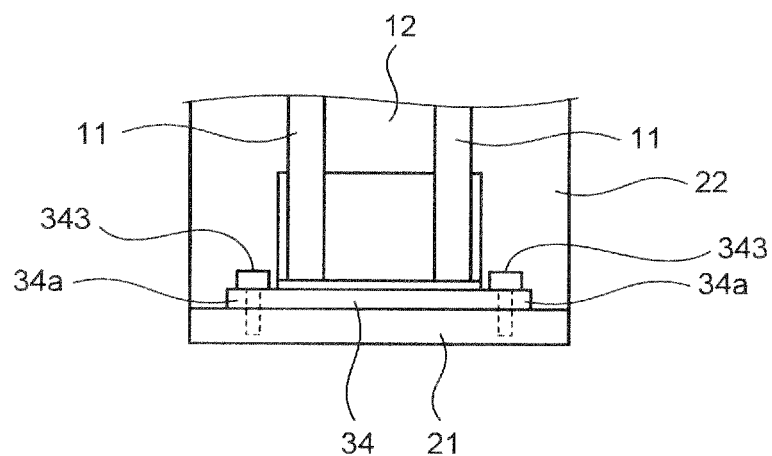
FIG. 2 is a schematic view which is viewed from arrow A of FIG. 1.

First, a microscope system according to a first embodiment will be described in detail with reference to the accompanying drawings. FIG. 1 is a schematic view illustrating an overall configuration of a microscope system 1 according to a first embodiment of the present invention. FIG. 2 is a schematic view which is viewed from arrow A of FIG. 1. In the first embodiment, an upright microscope will be described as an example.

As illustrated in FIG. 1, the microscope system 1 includes a stage 10 mounted with a specimen S1 having a small thickness, a microscope body part 20 having a substantially C shape in a side view, an incident-light illumination lamp house 31 installed at the rear side of the top (right side of FIG. 1) of the microscope body part 20, a transmitted illumination lamp house 32 installed at the rear side of the bottom (right side of FIG. 1) of the microscope body part 20, a lens barrel 33 placed on the top of the microscope body part 20, and a transmitted illumination and imaging unit 34 transmitting transmitted illumination light ejected from the transmitted illumination lamp house 32. Further, an eye lens 35 for observing with naked eyes a specimen image of the specimen S1 is attached to the lens barrel 33.

The stage 10 is supported by supporting members 11 and 12 having a substantially column shape, which extend vertically from the transmitted illumination and imaging unit 34. Further, the supporting member 12 holds a condenser 14 to move vertically through a condenser holder 13. In addition, an X-direction moving unit 101 moving the stage 10 in an X direction and a Y-direction moving unit 102 moving the stage 10 in a Y direction are provided on the stage 10 when a placement surface on which the specimen S1 is placed is regarded as an XY plane. Each of the X-direction moving unit 101 and the Y-direction moving unit 102 is provided to be rotatable and moves the stage 10 in each direction according to a rotational amount by the rotation.

The microscope body part 20 includes a base unit 21 having a flat-plate shape, a supporting column 22 that stands upright from the base unit 21, an incident-light illumination and imaging unit 23 (incident-light illumination optical system) provided on the end of a side different from the base unit 21 side of the supporting column 22, extending in a direction perpendicular to the extension direction of the supporting column 22, and allowing passage of the incident-light illumination light ejected from the incident-light illumination lamp house 31, and an objective arm 26 having a substantially L shape in a side view, which is supported to be movable vertically by the supporting column 22 and holds an objective lens 25 through a revolver 24.

The supporting column 22 extends in a vertical direction from a plate surface of the base unit 21 and includes a rotatable input unit 221 which inputs power for moving the objective arm 26. The input unit 221 transfers rotational power to the objective arm 26 side through, for example, a focusing mechanism such as a rack and pinion, or the like and moves the objective arm 26 in the vertical direction according to the rotational amount of the input unit 221 (pinion). A rack may be formed on the objective arm 26 and may be provided as a separate member connected with the objective arm 26. Further, the supporting column 22 is connected with the transmitted illumination lamp house 32 and emits the transmitted illumination light ejected from the transmitted illumination lamp house 32 to the transmitted illumination and imaging unit 34.

The incident-light illumination and imaging unit 23 allows passage of the incident-light illumination light of an optical axis N1 emitted from the incident-light illumination lamp house 31 and reflects the incident-light illumination light in an axis N2 direction by a cube unit 231. The axis N2 coincides with an optical axis of the objective lens 25. The cube unit 231 includes a plurality of cubes (not illustrated) and selectively places each cube on a light path depending on a microscopy. The incident-light illumination light from the incident-light illumination lamp house 31 is switched to the specimen S1 side or light (observation light) from the specimen S1 is switched to the eye lens 35 side, by the cube to switch the light path.

The revolver 24 is provided to be slidable or rotatable with respect to the microscope body part 20 and places the objective lens 25 above the specimen S1. The revolver 24 is configured by using an electric revolver, and the like. The revolver 24 holds a plurality of objective lenses 25 having different magnifications (observation magnifications) by a mounter, and selectively switches the objective lens 25 that is inserted onto the light path of the observation light and used for observation of the specimen S1.

As the objective lens 25, for example, at least each one of objective lenses (hereinafter, referred to as a 'low-magnification objective lens') having comparatively low magnifications of one, two, and four times and objective lenses (hereinafter, referred to as a 'high-magnification objective lens') of 10, 20, and 40 times which are high magnifications with respect to the magnifications of the low-magnification objective lenses are mounted on the revolver 24. The magnifications of the low-magnification objective lens and the high-magnification objective lens are examples. The magnification of the high-magnification objective lens needs to be higher than that of the low-magnification objective lens.

The transmitted illumination and imaging unit 34 allows passage of the transmitted illumination light emitted from the transmitted illumination lamp house 32 through the supporting column 22 and reflects the transmitted illumination light in the axis (N2) direction by a mirror 341. The axis (N2) coincides with an optical axis of the objective lens 25. The transmitted illumination light reflected by the mirror 341 is emitted toward the condenser 14 (specimen S1) from an emission window 342. In the first embodiment, the transmitted illumination and imaging unit 34 and the condenser 14 constitute a transmitted illumination optical system.

Further, the transmitted illumination and imaging unit 34 is fixed to the base unit 21 by a bolt 343 through a protrusion 34a that protrudes in a direction perpendicular to a direction in which the transmitted illumination and imaging unit 34 extends, as illustrated in FIG. 2. In fixing the transmitted illumination and imaging unit 34 to the base unit 21, the transmitted illumination and imaging unit 34 is positioned and fixed using a knock pin (not illustrated) or a worked abutment surface. A concave shape and a convex shape are formed in the base unit 21 and the transmitted illumination and imaging unit 34, respectively, such that a placement position of the transmitted illumination and imaging unit 34 with respect to the base unit 21 may be guided.

The incident-light illumination lamp house 31 and the transmitted illumination lamp house 32 condense light emitted from light sources 311 and 321 by using condenser lenses 312 and 322 and emit the condensed light outside the lamp house.

In this configuration, an extremely thin object such as a cell is observed as the specimen S1, in FIG. 1. Herein, when the specimen S1 is subjected to transparent observation, the transmitted illumination light from the light source 321 of the transmitted illumination lamp house 32 is reflected by the mirror 341 inside the transmitted illumination and imaging unit 34 to be emitted from the emission window 342 and passes through the condenser 14 and then transmits the specimen S1 to be incident in the eye lens 35 through the objective lens 25 and the cube unit 231.

Further, when the specimen S1 is subjected to incident observation, the incident-light illumination light from the light source 311 of the incident-light illumination lamp house 31 is reflected by the cube unit 231 and irradiated to the specimen S1 through the objective lens 25, and at the same time, light from the specimen S1 reflecting the irradiated light is incident in the eye lens 35 through the objective lens 25 and the cube unit 231.

In this case, by moving the objective arm 26 vertically in a length direction of the supporting column 22 through a focusing mechanism (not illustrated) by rotating the input unit 221, the objective lens 25 is moved on the axis N2 to perform a focusing operation.

Figure 3:
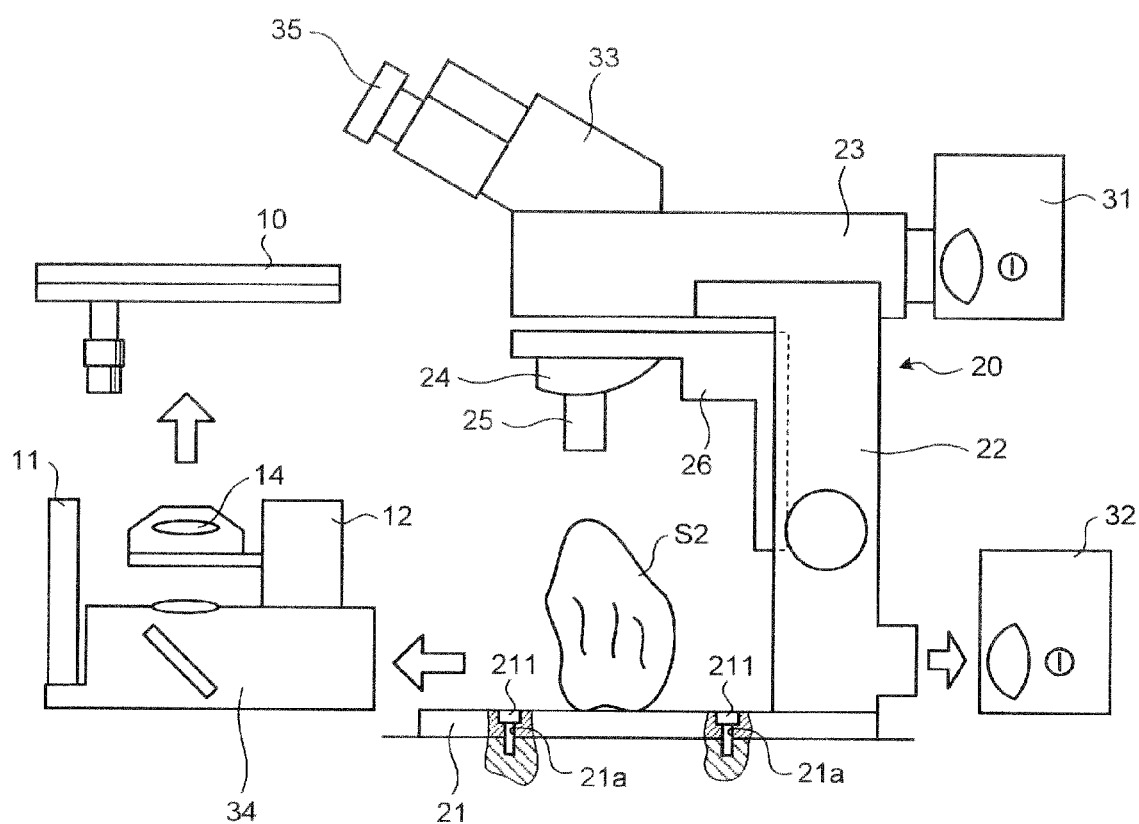
FIG. 3 is a partial cross-sectional view illustrating the configuration of the microscope system according to the first embodiment of the present invention.

Meanwhile, when a thick specimen S2 is observed, the specimen S2 may be observed by using the incident-light illumination light (see FIG. 3). In this case, the transmitted illumination and imaging unit 34 is separated from the base unit 21 by separating the bolt 343 illustrated in FIG. 2 from the base unit 21. Thereafter, a bolt (not illustrated) for fixing the stage 10 is loosened and separated and the stage 10 is separated from the supporting members 11 and 12. As a result, an area where the transmitted illumination and imaging unit 34 is installed may be set as a region (specimen placeable region) where the specimen S2 can be placed.

In this case, as illustrated in FIG. 3, the transmitted illumination lamp house 32 may be separated from the supporting column 22. Further, the supporting members 11 and 12 and the condenser 14 (condenser holder 13) may be separated from the transmitted illumination and imaging unit 34.

In this state, the thick specimen S2 is placed on the base unit 21 to perform the aforementioned incident observation. Herein, a plurality of bolt holes 21a for fixing the microscope on a vibration-free stand is provided in the base unit 21 and preferably fixed to the vibration-free stand by a bolt 211.

According to the first embodiment as described above, the transmitted illumination and imaging unit supporting the stage is separated and the thick specimen is placed on the placement surface, on which the transmitted illumination and imaging unit has been placed, and as a result, the extension range of the distance between the objective lens and the stage can be extended.

Further, in the first embodiment, since the distance between the objective lens 25 and the stage 10 corresponding to the specimen S2 can be changed only by separating the transmitted illumination and imaging unit 34, the specimen can be efficiently observed without increasing the number of components.

Note that, in the microscope system, the distance between the objective lens and the stage may be changed by replacing the base unit or the supporting column with a base unit having a different thickness or a supporting column having a different length. As a result, by selecting the base unit or supporting column which is suitable for the specimen, the specimen can be efficiently observed. Furthermore, the stage may be formed independently from the microscope body part. As a result, the change in focusing position by heat of the illumination light emitted from the lamp house can be prevented.

Figure 4:
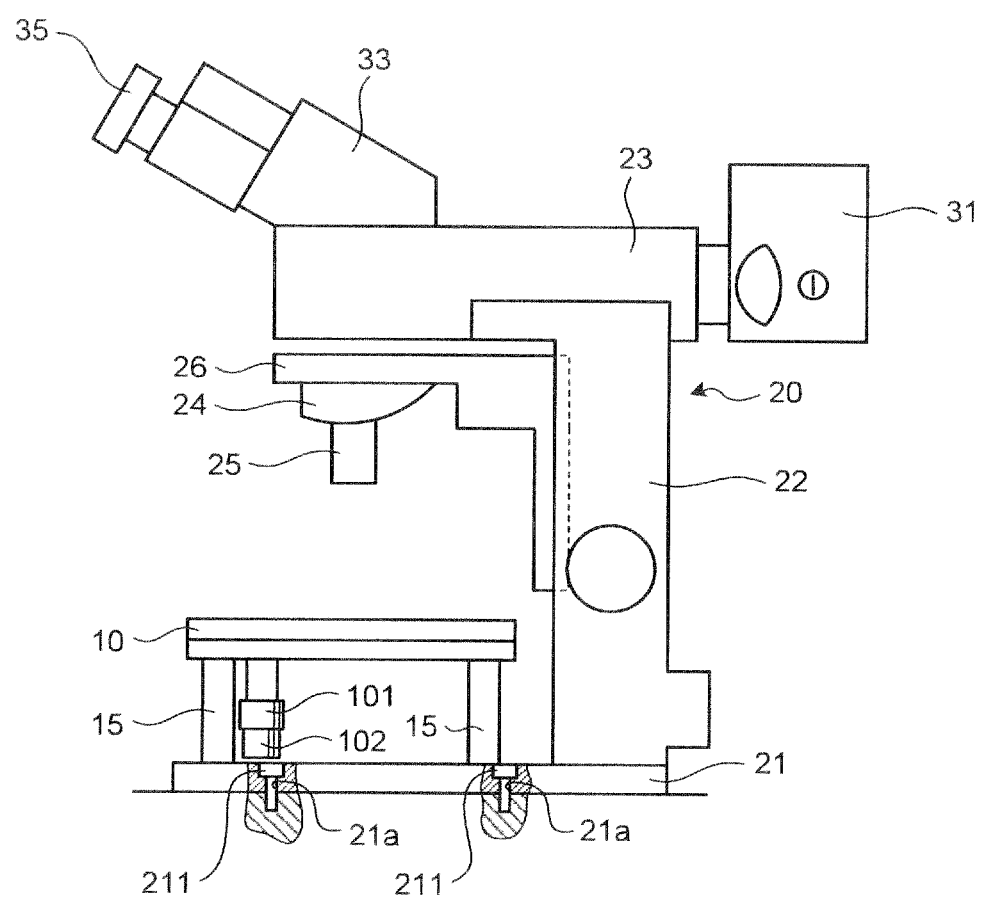
FIG. 4 is a partial cross-sectional view illustrating a configuration of a microscope system according to Modified Example 1-1 of the first embodiment of the present invention.

FIG. 4 is a partial cross-sectional view illustrating a configuration of a microscope system according to Modified Example 1-1 of the first embodiment. Like Modified Example 1-1 illustrated in FIG. 4, a supporting member 15 whose length in the longitudinal direction is shorter than the supporting member 11 may be fixed with respect to the base unit 21 illustrated in FIG. 3 and the supporting member 15 may support the stage 10 to change the height of the stage 10.

Figure 5:
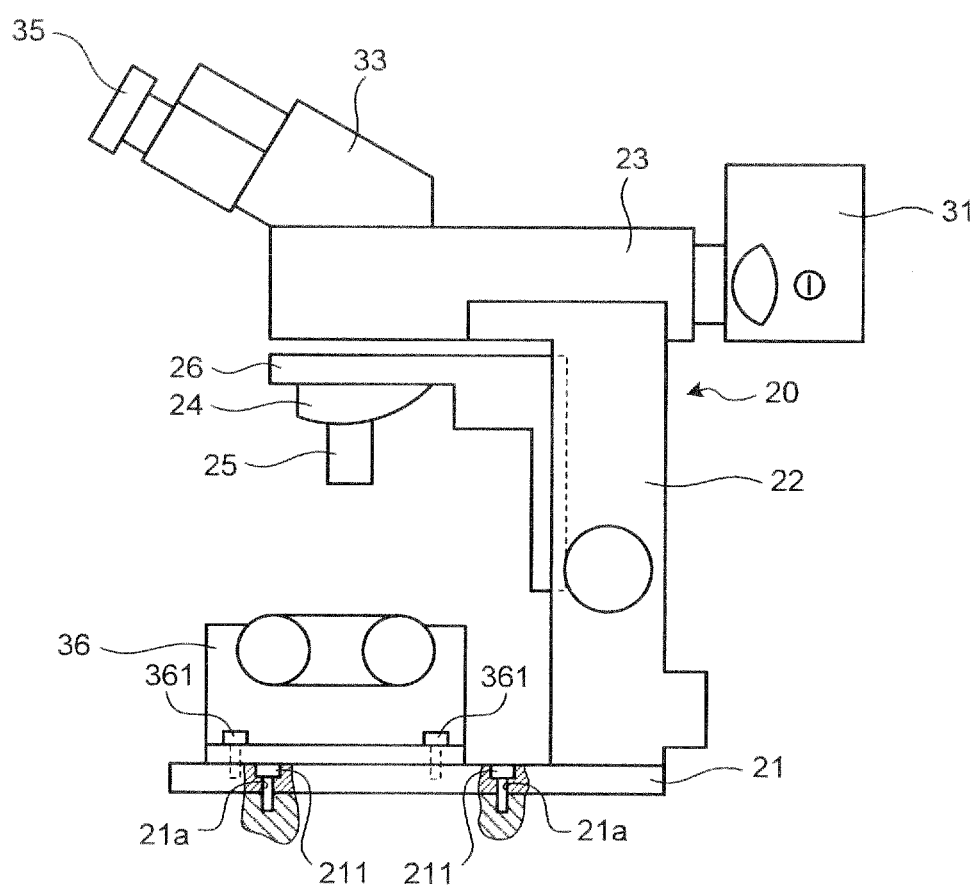
FIG. 5 is a partial cross-sectional view illustrating a configuration of a microscope system according to Modified Example 1-2 of the first embodiment of the present invention.

FIG. 5 is a partial cross-sectional view illustrating a configuration of a microscope system according to Modified Example 1-2 of the first embodiment. Like Modified Example 1-2 illustrated in FIG. 5, a running machine 36 may be fixed to the base unit 21 illustrated in FIG. 3 and a motion state of an animal serving as the specimen may be observed. The running machine 36 is fixed to the base unit 21 by, for example, a bolt 361.

Figure 6:
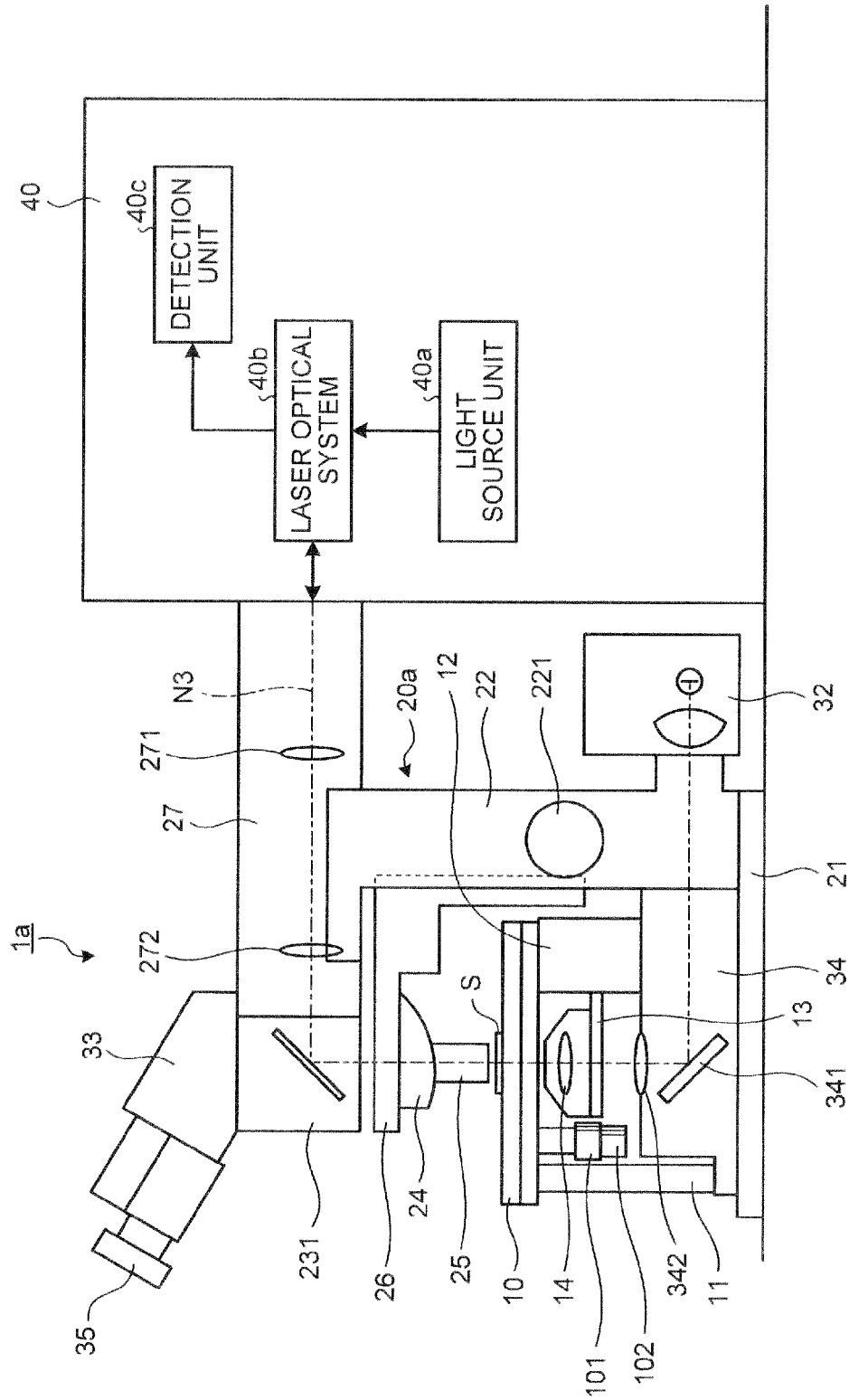
FIG. 6 is a schematic view illustrating a configuration of a microscope system according to Modified Example 1-3 of the first embodiment of the present invention.
Figure 7:
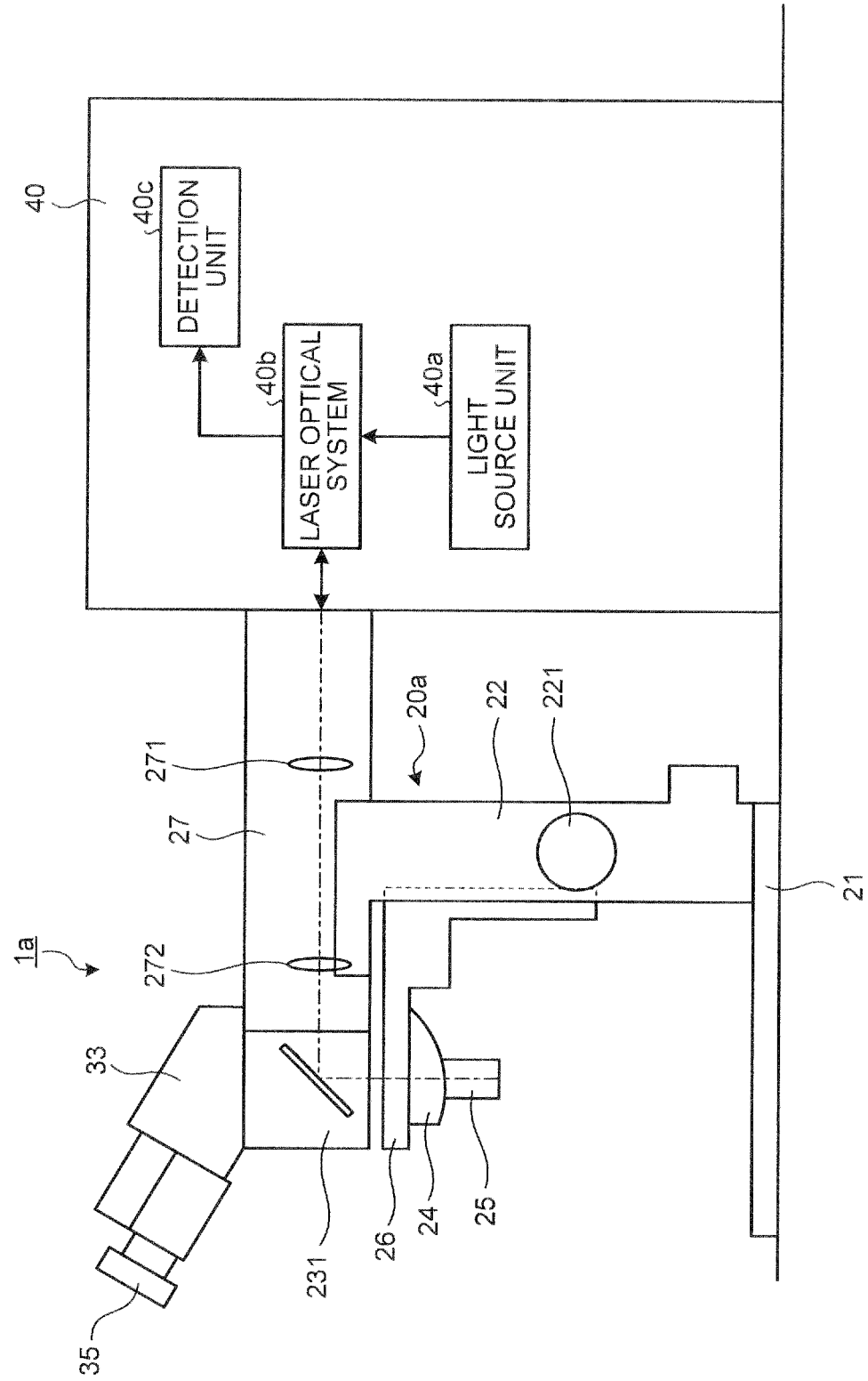
FIG. 7 is a schematic view illustrating the configuration of the microscope system according to Modified Example 1-3 of the first embodiment of the present invention.

FIGS. 6 and 7 are schematic views illustrating a configuration of a microscope system according to Modified Example 1-3 of the first embodiment of the present invention. A microscope system 1a illustrated in FIGS. 6 and 7 includes a laser unit 40 ejecting laser light as the incident-light illumination light, and a microscope body part 20a including the base unit 21, the supporting column 22, and a laser illumination and imaging unit 27 that is supported on the end of a side different from the base unit 21 side of the supporting column 22, extends in a direction perpendicular to the direction in which the supporting column 22 extends, takes in the laser light ejected from the laser unit 40 in connection with the laser unit 40 at one end side, and emits the taken-in laser light to the objective lens 25.

The laser unit 40 includes, for example, a light source unit 40a oscillating laser light having a predetermined wavelength, a laser optical system 40b allowing the light reflected by the specimen S to be incident through the laser illumination and imaging unit 27 as well as ejecting the laser light oscillated from the light source unit 40a toward the laser illumination and imaging unit 27, and a detection unit 40c detecting the light incident in the laser optical system 40b from the laser illumination and imaging unit 27. In detail, the laser unit 40 includes a laser light oscillating unit oscillating the laser light, a reflection mirror reflecting the laser light ejected from the laser light oscillating unit, and one or more dichroic mirrors selectively performing transmission and reflection of the laser light or collimate lenses converting the laser light into parallel light, and ejects laser light (optical axis N3) having a predetermined wavelength through an acoustic and optical variable filter and a single-mode fiber to the outside (microscope body part 20a). Further, the laser unit 40 allows the reflection light reflected from the specimen S to be incident through the laser illumination and imaging unit 27, and includes a detection unit detecting the incident light.

The laser illumination and imaging unit 27 allows the laser light from the laser unit 40 to be incident in the objective lens 25 through a pupil projection lens 271, an imaging lens 272, and the cube unit 231.

Further, as the conventional technique, the focusing mechanism including the objective lens and the laser illumination and imaging unit is provided at a desired height position with respect to the supporting column extending in a direction vertical to the base unit and the distance between the objective lens and the stage is changed, but when the focusing mechanism attached to the supporting column is mounted with a unit which has a large size and a large mass, like the laser unit, a load by the unit may be applied to the focusing mechanism attached to the supporting column and misalignment may occur on the optical axis. In addition, even when the laser unit is placed on a placement stand, a connection member connecting the laser unit and the illumination and imaging unit needs to be configured to follow vertical movement of the focusing mechanism.

In this regard, according to Modified Example 1-3, the transmitted illumination and imaging unit supporting the stage is separated and the specimen is placed on the placement surface on which the transmitted illumination and imaging unit is placed, and as a result, it is possible to deal with the change in distance without changing the position of the laser illumination and imaging unit even when the distance between the objective lens and the stage is changed. The distance between the objective lens and the stage can be extended depending on the thickness of the specimen. Further, misalignment of the optical axis by the laser unit can be prevented.

Second Embodiment

Figure 8:
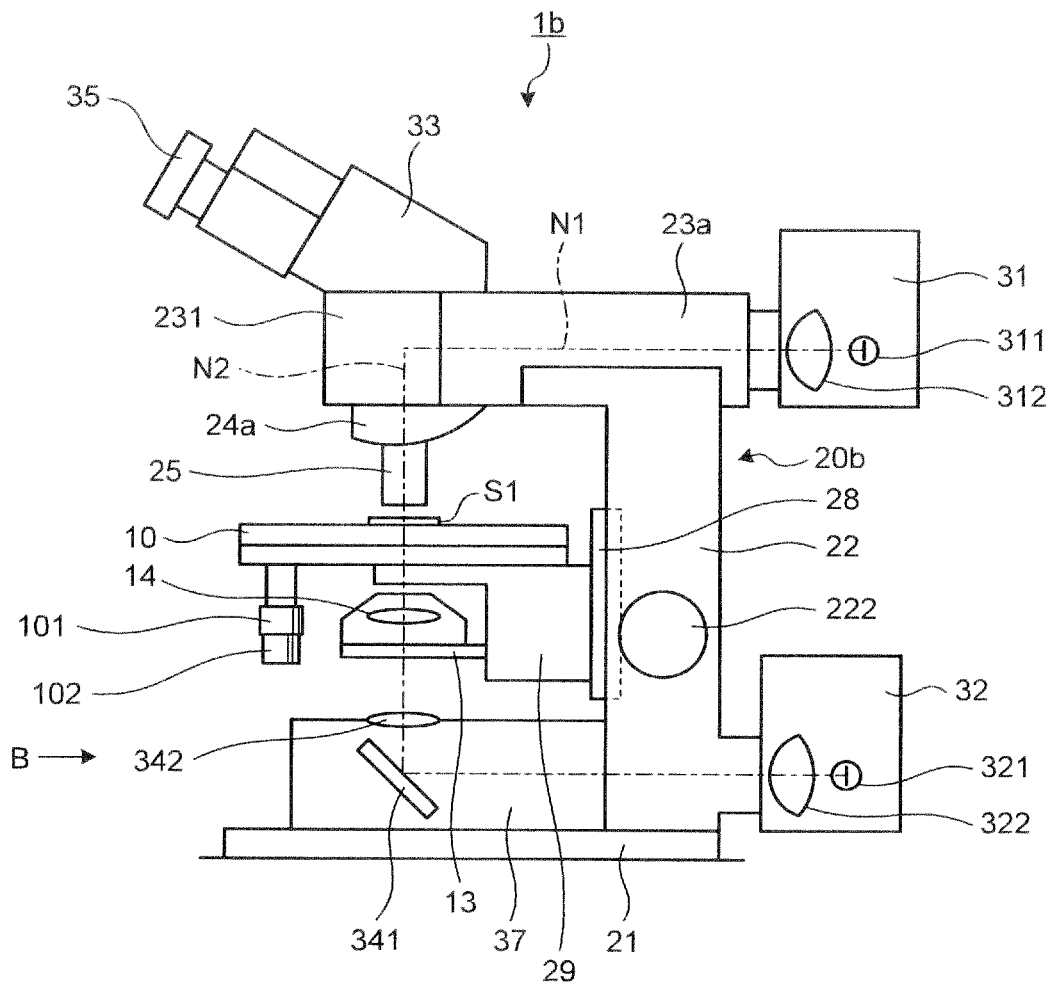
FIG. 8 is a schematic view illustrating a configuration of a microscope system according to a second embodiment of the present invention.
Figure 9:
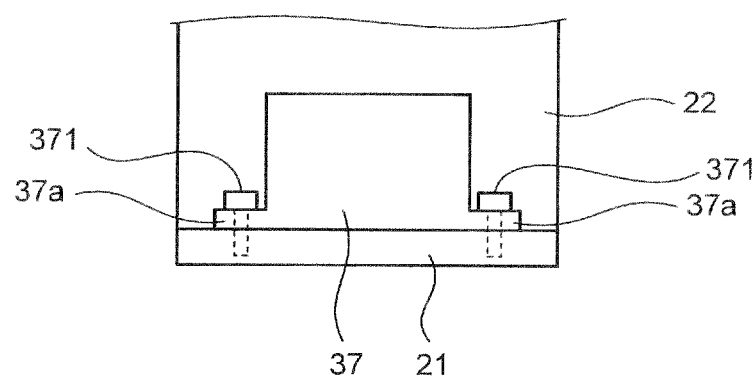
FIG. 9 is a schematic view which is viewed from arrow B of FIG. 8.

FIG. 8 is a schematic view illustrating a configuration of a microscope system 1b according to a second embodiment. FIG. 9 is a schematic view which is viewed from arrow B of FIG. 8. The same reference numerals refer to the same components as those described in FIG. 1, and the like. The microscope system 1b includes the stage 10, the incident-light illumination lamp house 31, the transmitted illumination lamp house 32, the lens barrel 33, a microscope body part 20b having the substantially C shape in a side view, and a transmitted illumination and imaging unit 37 allowing passage of the transmitted illumination light ejected form the transmitted illumination lamp house 32.

The microscope body part 20b includes the base unit 21, the supporting column 22, an incident-light illumination and imaging unit 23a supported on the end of a side different from the base unit 21 of the supporting column 22, extending in a direction perpendicular to a direction in which the supporting column 22 extends, and allowing passage of the incident-light illumination light ejected form the incident-light illumination lamp house 31, and a revolver 24a holding the objective lens 25 and held on the incident-light illumination and imaging unit 23a. Further, an elevation unit 28 that elevates along the supporting column 22 is provided on the supporting column 22. The elevation unit 28 removably supports a holding member 29 holding the stage 10 and the condenser holder 13. Herein, the stage 10 and the condenser 14 are supported on the elevation unit 28 with a distance relationship therebetween being fixed.

Further, the supporting column 22 is provided to be rotatable and includes an input unit 222 that inputs power for moving the elevation unit 28. The input unit 222 transfers rotational power to the elevation unit 28 side through, for example, the focusing mechanism such as the rack and pinion and moves the elevation unit 28 vertically according to a rotational amount of the input unit 222 (pinion). Note that, the rack may be formed in the elevation unit 28 and may be provided as a separate member connected with the elevation unit 28.

Further, the transmitted illumination and imaging unit 37 is fixed to the base unit 21 by a bolt 371 through a protrusion 37a that protrudes in a direction perpendicular to a direction in which the transmitted illumination and imaging unit 37 extends, as illustrated in FIG. 9. In fixing the transmitted illumination and imaging unit 37 to the base unit 21, the transmitted illumination and imaging unit 34 may be fixed using a knock pin (not illustrated) or a worked abutment surface with high positional reproducibility. Note that, a concave shape and a convex shape may be formed in the base unit 21 and the transmitted illumination and imaging unit 37, respectively, and a placement position of the transmitted illumination and imaging unit 37 with respect to the base unit 21 may be guided.

In this configuration, an extremely thin object such as a cell is observed as the specimen S1, in FIG. 8. Herein, when the specimen S1 is subjected to transparent observation, the transmitted illumination light from the light source 321 of the transmitted illumination lamp house 32 is reflected by the mirror 341 inside the transmitted illumination and imaging unit 37 to be emitted from the emission window 342 and passes through the condenser 14 and then transmits the specimen S1 to be incident in the eye lens 35 through the objective lens 25 and the cube unit 231.

Further, when the specimen S1 is subjected to incident observation, the incident-light illumination light from the light source 311 of the incident-light illumination lamp house 31 is reflected by the cube unit 231 and irradiated to the specimen S1 through the objective lens 25, and at the same time, light from the specimen S1 reflecting the irradiated light is incident in the eye lens 35 through the objective lens 25 and the cube unit 231.

In this case, by moving the elevation unit 28 vertically in a length direction of the supporting column 22 through a focusing mechanism (not illustrated) by rotating the input unit 222, the stage 10 is moved along the axis N2 to perform the focusing operation.

Figure 10:
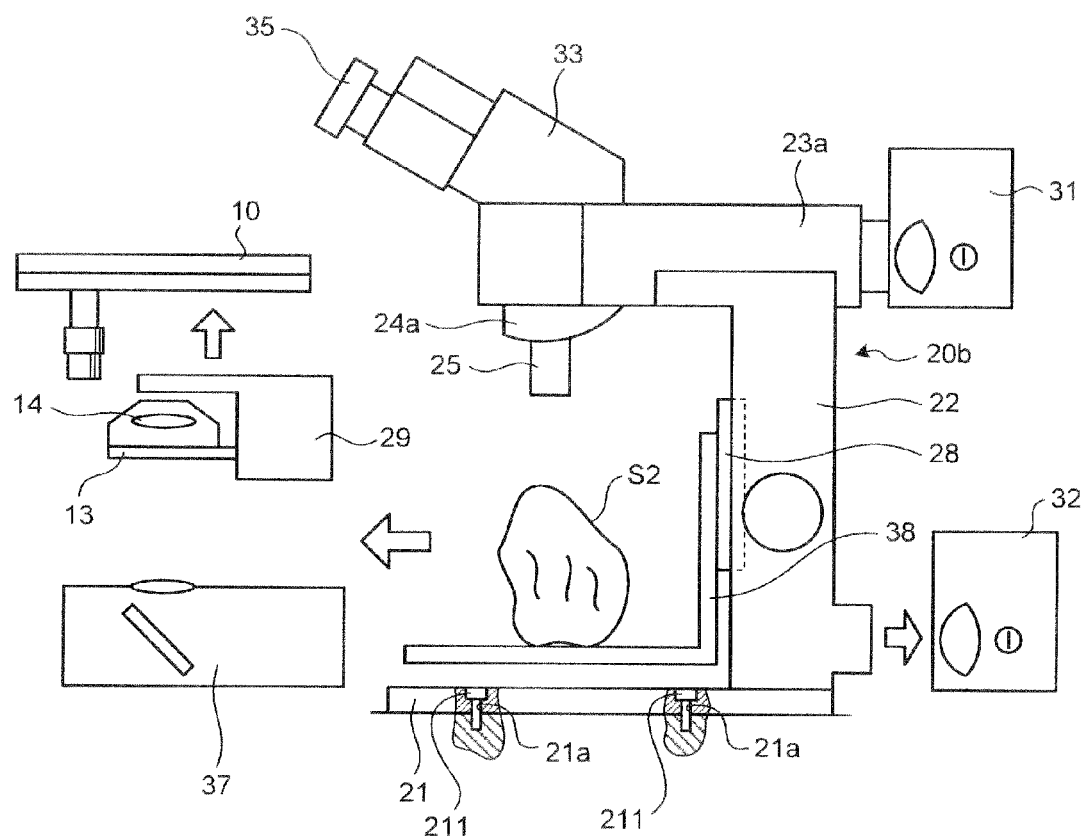
FIG. 10 is a partial cross-sectional view illustrating the configuration of the microscope system according to the second embodiment of the present invention.

Meanwhile, when the thick specimen S2 is observed, the specimen S2 is observed by using the incident-light illumination light (see FIG. 10). In this case, the transmitted illumination and imaging unit 37 is separated from the base unit 21 by separating the bolt 371 illustrated in FIG. 9 from the base unit 21. Thereafter, a bolt (not illustrated) fixing the elevation unit 28 and the holding member 29 is loosened and separated, and the holding member 29 holding the stage 10 and the condenser holder 13 is separated from the elevation unit 28. In this case, the stage 10 and the condenser holder 13 (condenser 14) supported on the elevation unit 28 are integrally separated. After the holding member 29 is separated, a placement member 38 having a substantially L shape in a side view is attached to the elevation unit 28. As a result, a specimen placed surface of the placement member 38 may be disposed in a region where the transmitted illumination and imaging unit 37 is installed.

In this case, as illustrated in FIG. 10, the transmitted illumination lamp house 32 may be separated from the supporting column 22. Further, the stage 10 may also be separated from the holding member 29.

The placement member 38 is elevated by the input unit 222 by placing the thick specimen S2 in the placement member 38 in this state to perform the aforementioned incident observation. Herein, a plurality of bolt holes 21a for fixing the microscope on a vibration-free stand is provided in the base unit 21 and preferably fixed to the vibration-free stand by the bolt 211.

According to the second embodiment described above, the transmitted illumination and imaging unit on the base unit is separated and the thick specimen is placed in the region where the transmitted illumination and imaging unit has been positioned, and as a result, the extension range of the distance between the objective lens and the stage can be extended.

Figure 11:
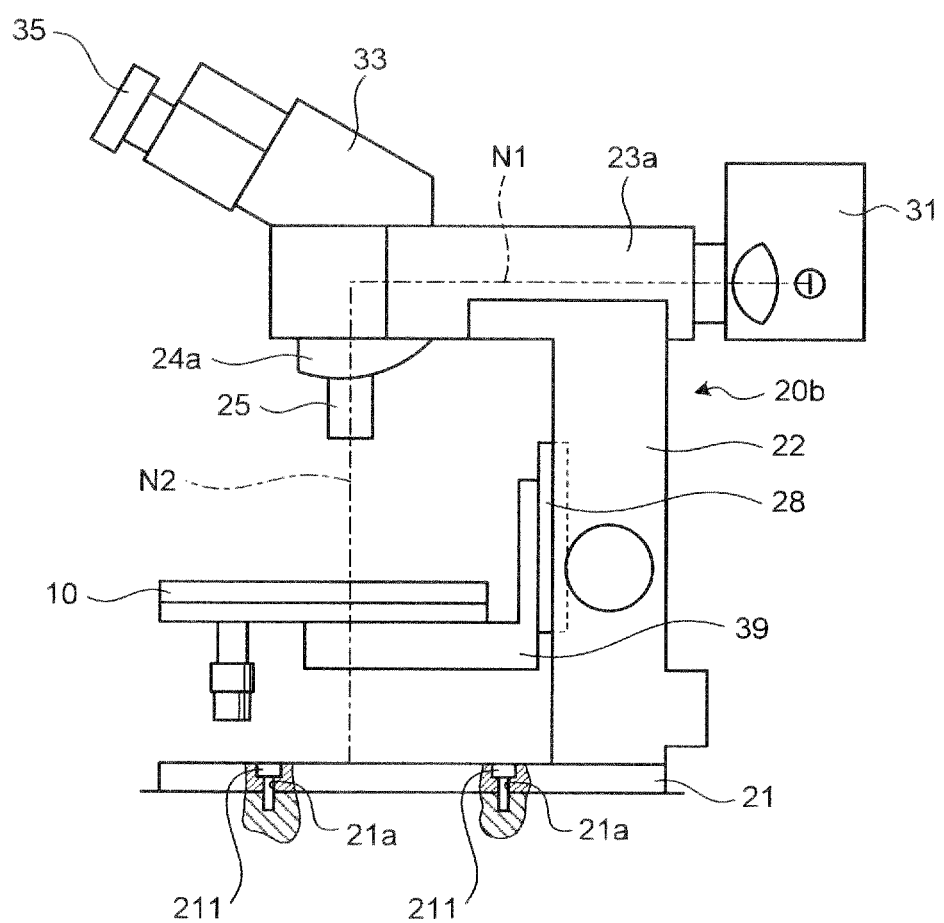
FIG. 11 is a partial cross-sectional view illustrating a configuration of a microscope system according to Modified Example 2-1 of the second embodiment of the present invention.

FIG. 11 is a partial cross-sectional view illustrating a configuration of a microscope system according to Modified Example 2-1 of the second embodiment. Like Modified Example 2-1 illustrated in FIG. 11, by fixing a stage holding member 39 whose length in the axis N2 direction is shorter than the elevation unit 28 illustrated in FIG. 10 and supporting the stage 10 by the stage holding member 39, the height of the stage 10 may be changed.

Figure 12:
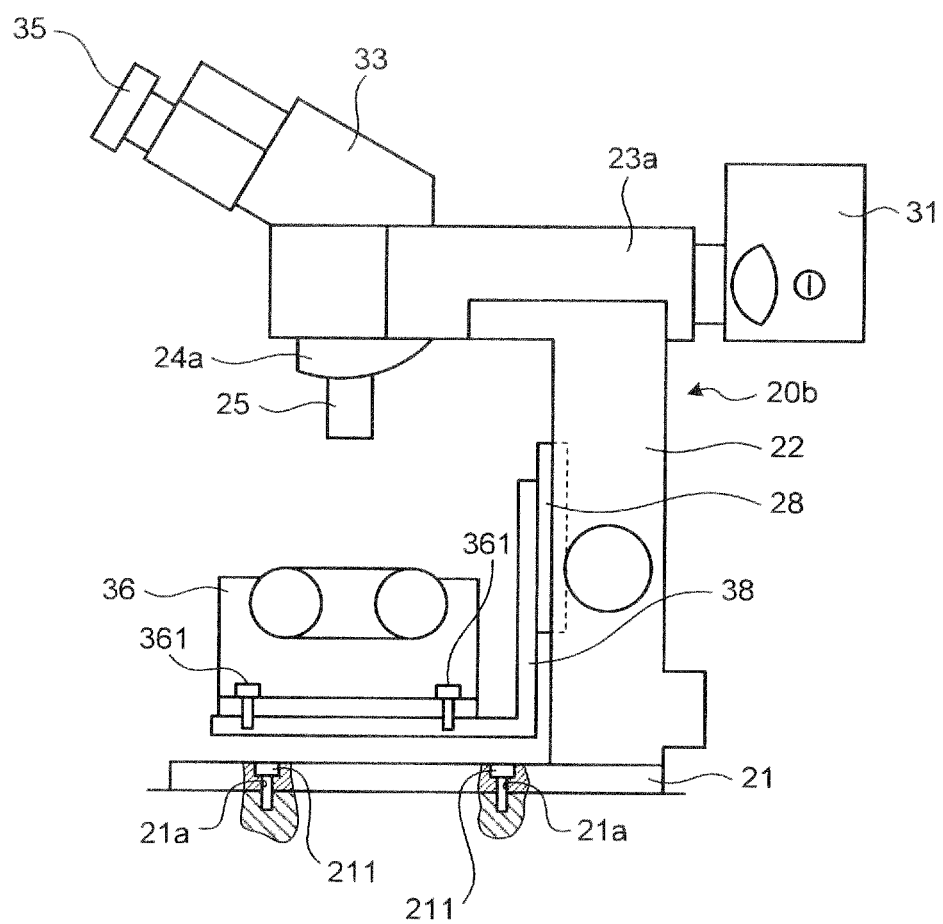
FIG. 12 is a partial cross-sectional view illustrating a configuration of a microscope system according to Modified Example 2-2 of the second embodiment of the present invention.

FIG. 12 is a partial cross-sectional view illustrating a configuration of a microscope system according to Modified Example 2-2 of the second embodiment. Like Modified Example 2-2 illustrated in FIG. 12, by fixing the aforementioned placement member 38 to the stage 10 with respect to the elevation unit 28 illustrated in FIG. 10, the placement member 38 may hold the running machine 36 and the motion state of the animal serving as the specimen may be observed. Note that, the running machine 36 is fixed to the placement member 38 by, for example, the bolt 361.

Figure 13:
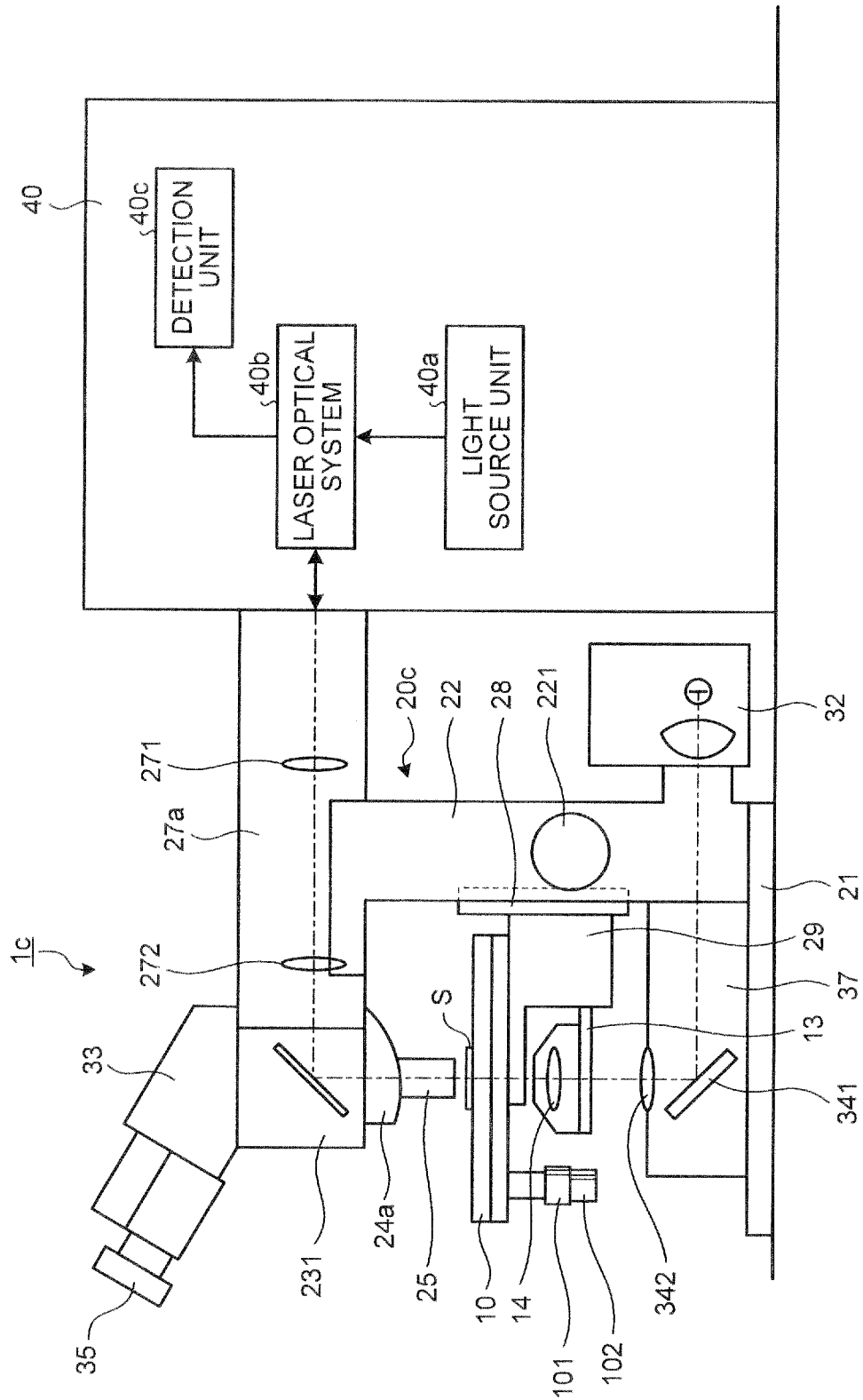
FIG. 13 is a schematic view illustrating a configuration of a microscope system according to Modified Example 2-3 of the second embodiment of the present invention.

FIGS. 13 and 14 are schematic views illustrating a configuration of a microscope system according to Modified Example 2-3 of the second embodiment of the present invention. Like Modified Example 1-3 described above, a microscope system 1c illustrated in FIGS. 13 and 14 may be configured to include the laser unit 40 instead of the incident-light illumination lamp house 31 and a microscope body part 20c having a laser illumination and imaging unit 27a instead of the incident-light illumination and imaging unit 23a, with respect to the microscope system 1b described above.

As a result, in the same manner as in Modified Example 1-3 described above, the transmitted illumination and imaging unit supporting the stage is separated and the specimen is placed on the placement surface, on which the transmitted illumination and imaging unit has been placed, and as a result, it is possible to deal with the change in distance without changing the position of the laser illumination and imaging unit even when the distance between the objective lens and the stage is changed as well as the distance between the objective lens and the stage can be extended depending on the thickness of the specimen. Further, misalignment of the optical axis by the laser unit can be prevented.

As described above, the microscope system according to the present invention is useful to extend the extension range of the distance between the objective lens and the stage.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope system comprising:
a stage on which a specimen is placed;
an objective lens configured to condense at least observation light from the specimen on the stage;
a transmitted illumination optical system configured to irradiate the specimen with transmitted illumination light ejected from a first light source, which is illumination light transmitting through the specimen, the transmitted illumination optical system including a transmitted illumination and imaging unit which houses a mirror which reflects the transmitted illumination light ejected from the first light source toward the specimen;
a microscope body part including a base unit holding the transmitted illumination optical system including the transmitted illumination and imaging unit which houses the mirror, a supporting column standing upright from the base unit, and an incident-light illumination optical system provided on an end of the supporting column on a side different from a base unit side of the supporting column and irradiating the specimen with incident-light illumination light which is illumination light ejected from a second light source to be reflected on the specimen; and
an objective arm provided on the supporting column, the objective arm supporting a revolver holding the objective lens, and being elevatable along the supporting column,
wherein the stage and the transmitted illumination optical system including the transmitted illumination and imaging unit which houses the mirror are attachable to and detachable from the microscope body part, and
wherein the specimen is placeable on the base unit in a state in which the stage and the transmitted illumination optical system are separated from the microscope body part.

2. The microscope system according to claim 1, wherein the transmitted illumination optical system further includes a condenser.

3. A microscope system comprising:
a stage on which a specimen is placed;
an objective lens configured to condense at least observation light from the specimen on the stage;
a transmitted illumination optical system configured to irradiate the specimen with transmitted illumination light ejected from a first light source, which is illumination light transmitting through the specimen; and
a microscope body part including a base unit holding the transmitted illumination optical system, a supporting column standing upright from the base unit, and an incident-light illumination optical system provided on an end of the supporting column on a side different from a base unit side of the supporting column and irradiating the specimen with incident-light illumination light which is illumination light ejected from a second light source to be reflected on the specimen,
wherein the stage and the transmitted illumination optical system are attachable to and detachable from the microscope body part,
wherein the microscope body part comprises:
an elevation unit provided on the supporting column, the elevation unit supporting the stage in a detachable manner, and being elevatable along the supporting column, and
a placement member which is attachable to the elevation unit in a state in which the stage and the transmitted illumination optical system are separated from the microscope body part, and
wherein the placement member places the specimen in an installation region of the transmitted illumination optical system.

4. The microscope system according to claim 3, wherein the transmitted illumination optical system includes a condenser, and the elevation unit attachably and detachably supports the condenser.

* * * * *